United States Patent

[11] 3,597,985

| [72] | Inventor | Joseph O. Jeffrey<br>Ithaca, N.Y. |
|---|---|---|
| [21] | Appl. No. | 7,403 |
| [22] | Filed | Feb. 5, 1970 |
| [45] | Patented | Aug. 10, 1971 |
| [73] | Assignee | Borg-Warner Corporation<br>Chicago, Ill.<br>Continuation of application Ser. No.<br>782,859, Dec. 11, 1968, now abandoned. |

[54] FLEXIBLE POWER TRANSMISSION DRIVE
8 Claims, 10 Drawing Figs.

[52] U.S. Cl. .................................................. 74/229,
74/243 S, 74/245 S
[51] Int. Cl. ........................................ F16h 7/00,
F16h 55/30, F16g 13/02
[50] Field of Search .......................................... 74/229, 243
R, 243 S, 245 S, 250 S

[56] References Cited
UNITED STATES PATENTS

| 2,770,977 | 11/1956 | Beckadolph et al. | 74/229 |
| 3,083,583 | 4/1963 | Szonn | 74/229 |
| 3,338,107 | 8/1967 | Kiekhoefer | 74/229 |
| 3,120,409 | 2/1964 | Beall | 305/13 |
| 3,404,576 | 10/1968 | Cicognani et al. | 74/229 |

*Primary Examiner*—Leonard H. Gerin

ABSTRACT: For the purpose of illustrating the present invention, a flexible power transmission drive is disclosed herein which includes a flexible band that can be a chain, a belt, or the like, which is adapted to drivingly encircle and engage a sprocket. The sprockets and cooperating band structures disclosed herein have a mismatched pitch and are provided with complemental engaging surfaces to provide a smooth transitional engagement between the band and the sprocket and to cause the band to move with the sprocket along a constant sprocket-pitch radius.

Patented Aug. 10, 1971

INVENTOR.
JOSEPH O. JEFFREY

BY Evan D. Roberts

ATTORNEY.

Patented Aug. 10, 1971

INVENTOR.
JOSEPH O. JEFFREY
BY Evan D. Roberts
ATTORNEY.

Patented Aug. 10, 1971
3,597,985
3 Sheets-Sheet 3
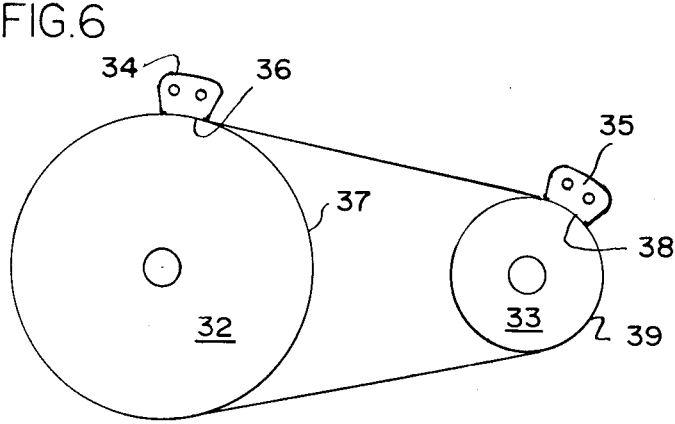
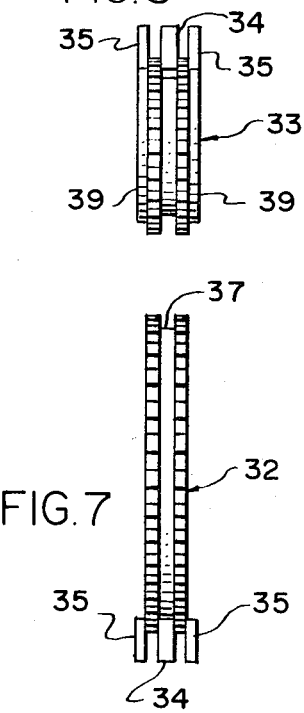
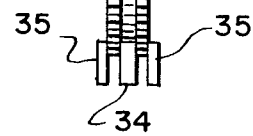
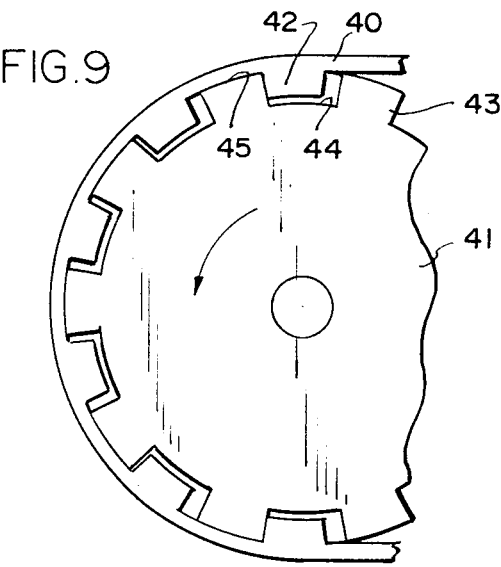
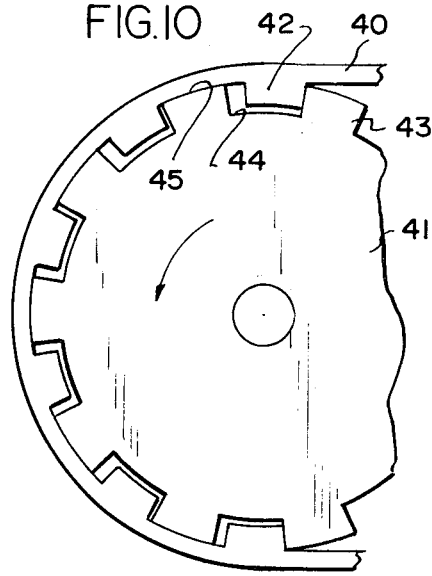
INVENTOR
JOSEPH O. JEFFREY
BY Evan D. Roberts
ATTORNEY.

3,597,985

FLEXIBLE POWER TRANSMISSION DRIVE

This is a continuation of Ser. No. 782,859 filed Dec. 11, 1968, now abandoned.

SUMMARY OF THE INVENTION

This invention relates to a flexible power transmission drive wherein a flexible toothed band such as a belt or power transmission chain is adapted to drivingly encircle two or more sprockets. The band is provided with support surfaces to complementally engage sprocket support shoulders adapted to complementally receive the band support surfaces to position the band circumferentially on said sprockets at a constant sprocket-pitch radius, and prevent the band teeth from irregular radial engagement with the sprocket teeth and tooth roots. The band teeth are provided with a pitch that is different than the pitch of the sprocket teeth whereby the band teeth and the sprocket teeth will be in engagement on only one side of the sprocket, namely the tight side or the slack side of the band. In the situation where the band will be utilized in conjunction with different-sized sprockets, the band is provided with a set of support surfaces for each sprocket, whereby the surfaces will complementally engage a corresponding shoulder surface of a respective sprocket with no other supporting engagement between the band and that sprocket, and thereby, the band will be received on each different-sized sprocket by a different set of band support surfaces particularly complementally adapted for engagement with the shoulder surfaces of that sprocket to maintain a fixed radial position thereon.

This flexible power transmission drive provides a power drive wherein the band thereof will always be forced to move with the sprocket on a constant sprocket-pitch radius with a gradual engagement or disengagement of the band teeth with the sprocket teeth as the band moves with the sprocket which provides a much quieter and smoother operating sprocket and band engagement, and accordingly, reduces the wear normally resulting from otherwise abrupt engagements. Also, inasmuch as the sprocket and band engaging teeth on opposite sides of the sprocket are in opposite engaging relationship, there is less tendency for backlash in the present invention.

Further, this invention applies equally to power chains or belts, and to drives having sprockets of greatly different diameters. Also, this invention provides a structure whereby a chain band will engage the sprocket on a transitional surface of the chain whereby the engagement therebetween is smooth and quiet.

Other advantages and novel aspects of the invention will become apparent upon consideration of the following detailed description, in conjunction with the accompanying drawing wherein:

FIG. 6 is a schematic representation of this invention with respect to a chain band applied to sprockets of different radii showing two different guide links providing complemental engagement between the guide links and the different radii sprockets;

FIG. 7 is an edge view of the large sprocket illustrated in FIG. 6 showing the centered guide link of a chain in engagement with a center shoulder on the sprocket and the outer guide links of the chain in nonengagement with a shoulder;

FIG. 8 is an end view of the small sprocket shown in FIG. 6 showing the two side links in complemental engagement with the side shoulders of the smaller sprocket and the center link of the chain in nonengagement with a recessed center nonsupporting shoulder on the smaller sprocket;

FIG. 9 is an axial view of a flexible belt-type band in engagement with a sprocket wherein the belt band tooth pitch is less than the sprocket tooth pitch; and FIG. 10 is an axial view of a belt-type flexible band in engagement with a sprocket wherein the belt band tooth pitch is greater than the sprocket tooth pitch.

Referring to FIGS. 1—5, there is illustrated a flexible power transmission band provided in conjunction with a sprocket wherein the band is represented by a chain and is generally designated by the numeral 10. The sprocket is generally designated by the numeral 11.

Figure 1:
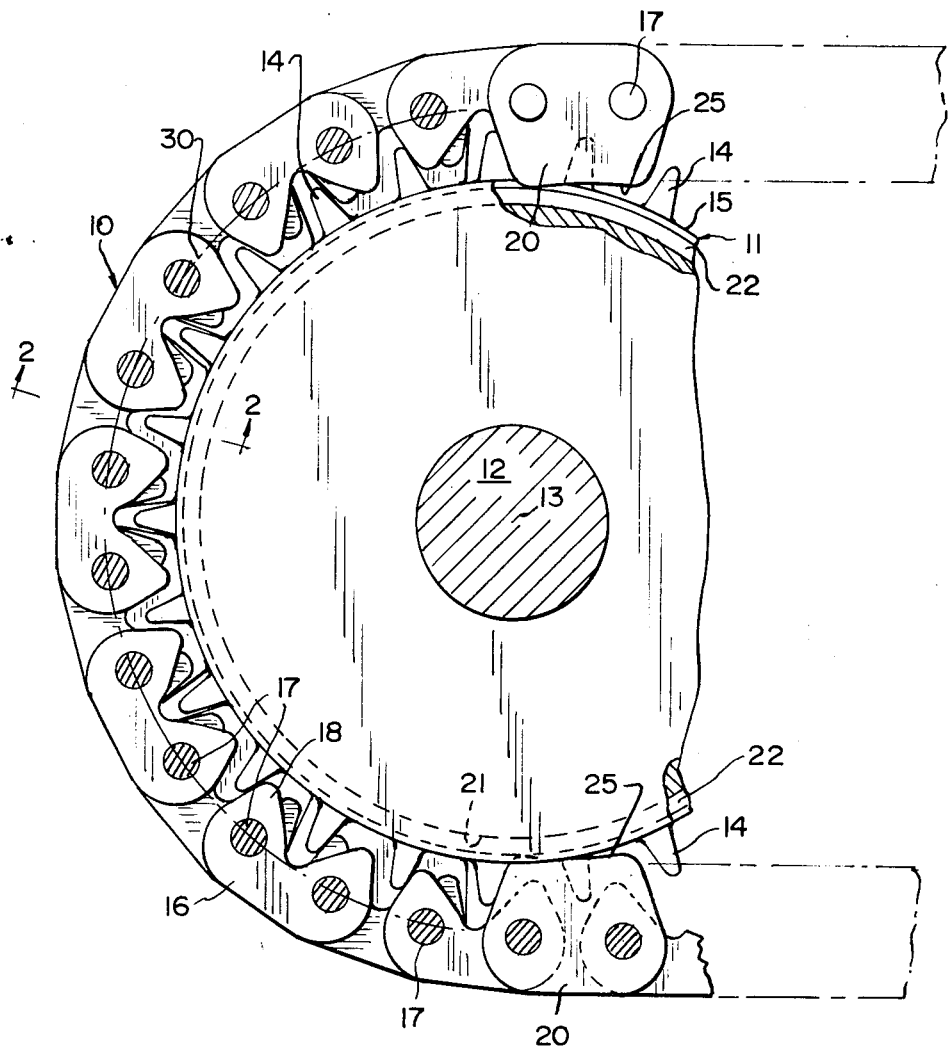
FIG. 1 is a partial sectional view of a chain band in engagement with a sprocket showing a mismatching relationship between the chain and sprocket teeth and a constant pitch-radius position of the chain on the sprocket.
Figure 2:
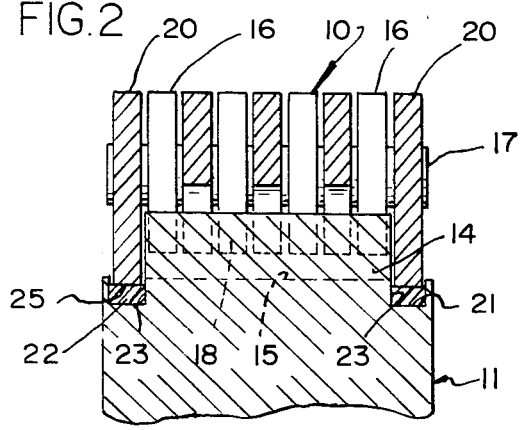
FIG. 2 is a partial sectional view taken along line 2-2 of FIG. 1 showing the configuration of the drive and guide links of the chain shown in FIG. 1.

The sprocket 11 is secured to a shaft 12 to be rotatably mounted about the axis 13 thereof. Sprocket teeth 14 are provided on the periphery of the sprocket 11 with tooth roots 15 positioned circumferentially therebetween. The chain 10 is composed of alternate sets of drive links 16 interconnected by a pin 17 and which are provided with tooth-engaging portions 18 extending therefrom. Guide links 20 are also provided on opposite ends of the pin 17 and alternate sets of driven links 16 (FIGS. 1 and 2).

The sprocket 11 is provided with shoulders, generally designated as 21, which in turn may have plastic or other elastomer rings 22 as a part thereof in a groove 23 thereon to complementally engage a concave arcuate band support surface 25 on the bottom of the guide links 20 (FIGS. 1, 2, 4 and 5). The concave surface 25 of the guide links 20 (FIG. 5) has a radius 26 equal to a radius of the sprocket support shoulder 21. An arcuate transitional surface 27 is provided on each end of the bottom of the guide link 20.

The transitional surface 27 has a radius 28 equal to the distance between the most adjacent pin of the chain and the concave arcuate band support surface 25 at a point 29 tangent to the transitional surface 27. The transitional surface 27 provides a constant radius of engagement between the guide links 20 and the sprocket shoulder support surface 21 (FIG. 1), which minimizes the rise and fall or radial movement of the chain 10 during engagement and disengagement thereof with the sprocket support surface 21. After the chain has engaged the sprocket to the point wherein the transitional surface 27 has been passed, the guide links 20 will engage the support surface 21 of the sprocket in a complemental fashion along the arcuate band support surface 25 thereof.

The band support surface 25 (FIGS. 1, 2, 4 and 5) of the guide links 20 will thereby provide a fixed radial position for the chain 10 on the sprocket 11 as the chain 10 moves with the sprocket 11. In particular, the pins 17 of the chain 10 will move along a sprocket-pitch circle 30 (FIGS. 1 and 5) at a constant radius 31. It is important for a desirable smooth transitional engagement of the guide links 20 with the sprocket support surface 21 that the arcuate band support surface 25 of the guide links 20 be complemental to the sprocket support surface shoulders 21. This will also minimize the wear between the chain 10 and the sprocket 11, and accordingly, prevent undesirable deviations accompanied by wear.

However, in a situation where a chain 10 encircles tow sprockets 32 and 33 of greatly different diameters (FIGS. 6—8) it is impossible for one set of guide links 20 of the chain to complementally and most appropriately engage both sprockets of different sizes. Accordingly, it is another aspect of this invention to provide a flexible hand, and more particularly, a flexible power transmission chain which possesses one set of guide links 34 for one diameter sprocket 32 (FIGS. 6 and 7) and another set of guide links 35 for another diameter sprocket 33 (FIGS. 6 and 8).

Thus this aspect of the invention provides a flexible power transmission drive 10 wherein certain guide links 34 are provided with arcuate band support surfaces 36 adapted to complementally engage a large sprocket support shoulder 37 and another set of guide links 35 is provided having arcuate band support surfaces 38 adapted to complementally engage smaller guide support shoulders 39 of the smaller sprocket 33. This structure thereby provides a power transmission chain 10 and double sprocket 32 and 33 combination wherein certain guide links 34 and 35 of the chain 10 are always in complemental supporting engagement with the sprocket support shoulder surfaces 37 or 39 used in conjunction therewith independent of the substantial difference in size that may exist between the sprockets 32 and 33.

Figure 3:
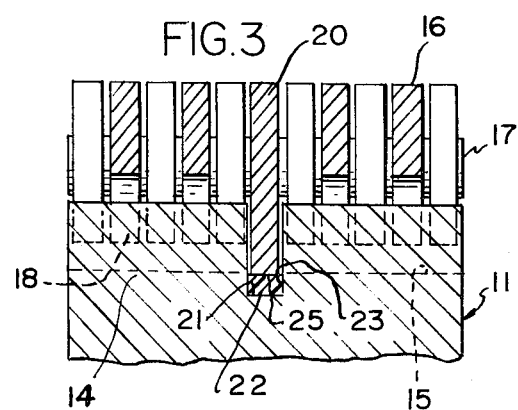
FIG. 3 is a partial sectional view taken along a radial line of a chain in engagement with a sprocket showing a modification of the present invention with a single set of guide links positioned in the center of the chain.
Figure 4:
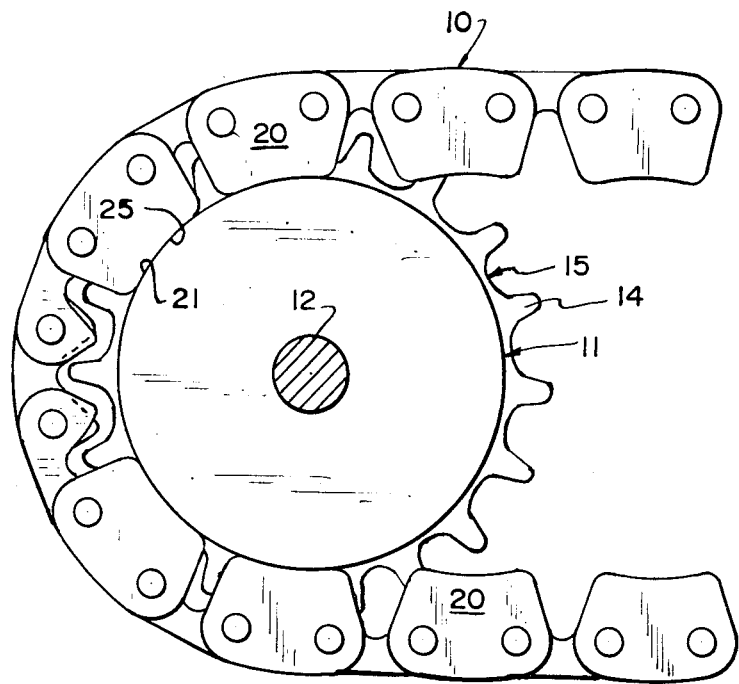
FIG. 4 is a partially sectioned view showing the general relationship of the guide links shown in FIG. 2 with respect to the sprocket.
Figure 5:
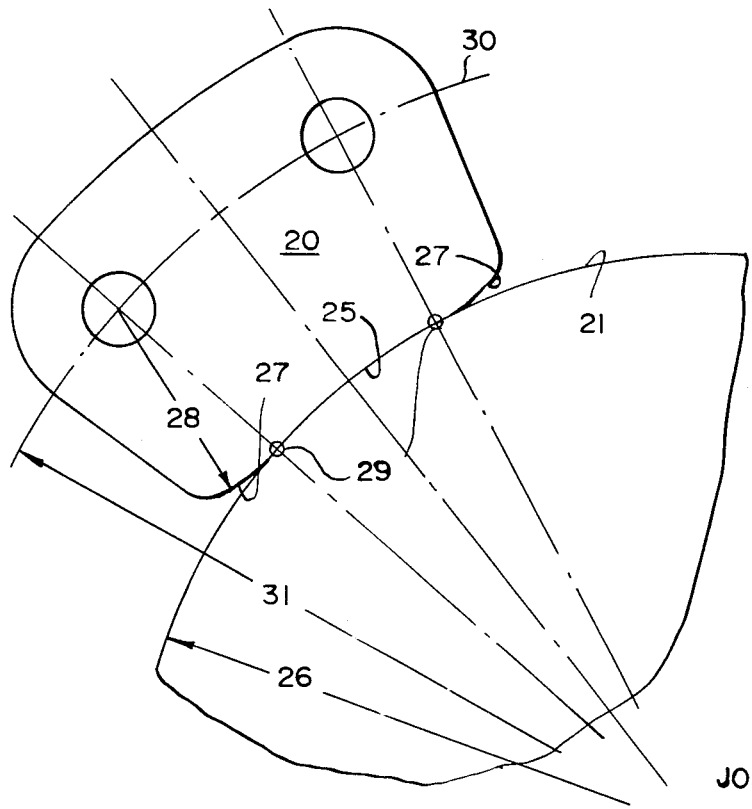
FIG. 5 is an isolated representation of a guide link with respect to a sprocket showing the arcuate complemental engaging surfaces therebetween and the arcuate transitional surfaces on the pins of the guide link in tangential relationship with the complemental surfaces.

FIG. 3 illustrates an embodiment of this invention wherein the guide links 20 are positioned in a single row in the center of the chain 10 and the support shoulder 21 is similarly complementally provided in the center of the sprocket 11.

The basic principles of this invention also apply to a flexible belt 40 as the band 10 used in conjunction with a belt sprocket 41 (FIGS. 9 and 10). In this situation, a belt 40 is provided with teeth 42 adapted to engage teeth 43 of the sprocket 41 wherein a sprocket tooth root portion 44 is provided between the teeth 43 of the sprocket 41. The tooth pitch of the belt band 40 can be less than the sprocket tooth pitch (FIG. 9), or the belt tooth pitch of the belt band 40 can be greater than the sprocket tooth pitch (FIG. 10). However, in both cases, it is important to note that a shoulder support surface 45 is provided on the outer periphery of the sprocket teeth 43 and the teeth 42 of the belt 40 are radially shorter than the teeth 42 on the sprocket so that the sprocket shoulder surfaces 45 will support the belt 40 at a radial distance whereby the teeth 42 of the belt will not engage the tooth root portions 44 of the sprocket.

In the situation where the tooth pitch of the belt band 40 is less than the tooth pitch of the sprocket 41 (FIG. 9), the belt teeth 42 will tend to engage the nondriving side of the sprocket teeth 43 adjacent the tight strand side of the belt 40 on sprocket 41 and will gradually move with respect to the sprocket teeth 43 as the belt 40 and sprocket 41 are rotated together counterclockwise to a point adjacent the slack strand side of belt 40 on sprocket 41 whereby the sprocket teeth 43 will engage the driving side of the belt tooth 40. This situation is made possible by the rotation of the belt 40 with the sprocket 41 at a fixed-pitch radius determined by the strand-support surfaces 45 of the sprocket in engagement with the belt 40.

In the situation where the pitch of the belt band 40 is greater than the pitch of the sprocket 41 (FIG. 10), the sprocket teeth 43 will engage the belt teeth 42 on the tight strand side of the belt 40 on sprocket 41 and thereafter the belt teeth 42 will gradually disengage the sprocket teeth 43 as the sprocket 41 moves with the belt 40 to a point where the belt teeth will tend to engage the nondriving side of the sprocket teeth 43 adjacent the slack strand side of the belt 40.

Although considerable emphasis has been placed on the complemental contour of the support surfaces 25 on the guide links 20 and the shoulder surface on the sprockets by using a separate set of guides when the sprockets are of different size, it should also be understood that precise conformity of the guide link support surfaces with the sprocket shoulders is not an absolute necessity to the substantial achievement of the primary function thereof, namely, to maintain the band on a fixed pitch circle at a predetermined radius on the sprockets. To provide perfect conformity between the two surfaces would require a special guide link contour for every size of sprocket. In actual commercial use, it would be appropriate to compromise by not fitting given guide links with either sprocket perfectly except when production is sufficiently high for sprockets of a certain size.

It is to be understood that the invention is not to be limited to the specific construction and arrangements shown and described, as it will be understood to those skilled in the art that certain changes may be made without departing from the principles of the invention.

What I claim is:

1. A flexible power transmission drive comprising a flexible toothed chain having sets of drive links and guide links pivotally interconnected to form said chain and drivingly encircling first and second rotatably supported sprockets having teeth drivingly engaging the teeth of said chain to cause a tight and a slack band side respectively on opposite sides of said sprockets, said sprockets having tooth roots between the teeth thereof, said chain having support surfaces complementally engaging a sprocket shoulder, said sprockets having shoulder support surfaces complementally engaging said chain support surfaces to position said band circumferentially on said sprockets on a constant sprocket pitch radius and preventing said chain teeth from engaging said sprocket tooth roots, said chain teeth having a pitch different than the pitch of said sprocket teeth to cause maximum driving engagement force between said chain teeth and said sprocket teeth on only one side of said sprockets.

2. A flexible power transmission drive as defined in claim 1 wherein said chain teeth have a pitch less than said sprocket teeth thereby causing the maximum driving force between said chain teeth and said sprocket teeth to occur on the slack side.

3. A flexible power transmission drive as defined in claim 1 wherein said chain teeth have a pitch greater than said sprocket teeth thereby causing the maximum driving force between said chain teeth and said sprocket teeth to occur on the tight side.

4. A flexible power transmission drive as defined in claim 1 wherein the pitch of the teeth on one of said sprockets is greater than that of the teeth on said chain thereby causing the maximum driving force between said chain teeth and said sprocket teeth to occur on the slack side of the chain, and the pitch of the teeth on the other of said sprockets is less than that of the teeth on said chain and thereby causing the maximum driving force between said chain teeth and the teeth of this said sprocket to occur on the tight side of the chain.

5. A flexible power transmission drive as defined in claim 1 wherein said sprockets are of different diameters.

6. A flexible power transmission drive as defined in claim 5 wherein said chain support surfaces are provided in laterally spaced sets with one set for each sprocket respectively, and said sprocket shoulder surfaces are provided on said sprockets to correspond respectively with said chain support surfaces whereby each of said sprocket shoulder surfaces will engage a respective chain support surface only to position said chain circumferentially on said respective sprocket on a constant radius for said sprocket.

7. A flexible power transmission drive as defined in claim 1 wherein an arcuate convex sprocket shoulder engaging surface is provided on said guide links as a tangential extension of said chain-supporting surfaces to provide a smooth transitional engagement between said sprocket shoulder and said guide link support surface.

8. A flexible power transmission drive as defined in claim 7 wherein said convex shoulder-engaging surface has a radius concentric with the adjacent pivotal interconnection of said links, and the sum of the convex radius plus the concave radius of said chain support surface equals the sprocket pitch radius at the point of tangency of said two radii.